(12) United States Patent
Andrew

(10) Patent No.: US 8,262,345 B2
(45) Date of Patent: Sep. 11, 2012

(54) CERAMIC MATRIX COMPOSITE TURBINE ENGINE

(75) Inventor: Philip L. Andrew, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 717 days.

(21) Appl. No.: 12/367,277

(22) Filed: Feb. 6, 2009

(65) Prior Publication Data

US 2010/0202873 A1    Aug. 12, 2010

(51) Int. Cl.
*F01B 25/02* (2006.01)

(52) U.S. Cl. ........................................ 415/159; 415/200

(58) Field of Classification Search .................. 415/159, 415/200; 416/97 R
See application file for complete search history.

(56) References Cited

U.S. PATENT DOCUMENTS

| | | |
|---|---|---|
| 3,563,669 A | 2/1971 | Hockert et al. |
| 3,588,269 A | 6/1971 | Wall, Jr. |
| 3,601,991 A | 8/1971 | Johnson |
| 3,604,210 A | 9/1971 | Johnson |
| 3,638,422 A | 2/1972 | Loft et al. |
| 3,639,076 A | 2/1972 | Rowen |
| 3,674,337 A | 7/1972 | Marcatili |
| 3,674,377 A | 7/1972 | Trappmann |
| 3,680,309 A | 8/1972 | Wallace, Jr. |
| 3,719,041 A | 3/1973 | Barnard et al. |
| 3,719,427 A | 3/1973 | Davis |
| 3,786,992 A | 1/1974 | Robinson |
| 3,790,298 A | 2/1974 | Hendrickson et al. |
| 3,966,352 A | 6/1976 | White et al. |
| 4,003,675 A | 1/1977 | Stevens et al. |
| 4,005,572 A | 2/1977 | Giffhorn |
| 4,025,227 A | 5/1977 | Greenburg et al. |
| 4,053,256 A | 10/1977 | Hertel |
| 4,067,661 A | 1/1978 | Gebhart et al. |
| 4,135,362 A | 1/1979 | Glenn |
| 4,145,875 A | 3/1979 | Liddle et al. |
| 4,150,915 A | 4/1979 | Karstensen |
| 4,163,629 A | 8/1979 | McDonough et al. |
| 4,169,692 A | 10/1979 | McDonough et al. |
| 4,173,121 A | 11/1979 | Yu |
| 4,187,054 A | 2/1980 | Landis, Jr. et al. |
| 4,193,738 A | 3/1980 | Landis, Jr. et al. |

(Continued)

FOREIGN PATENT DOCUMENTS

CA    2603130    9/2007

(Continued)

OTHER PUBLICATIONS

Composites; GE Energy; http://www.gepower.com/prod_serv/products/composites/en/downloads/gea13712_composite.pdf.

*Primary Examiner* — Matthew C. Landau
*Assistant Examiner* — Joseph C Nicely
(74) *Attorney, Agent, or Firm* — Fletcher Yoder, P.C.

(57) ABSTRACT

In one embodiment a transition section for a turbine engine is provided that includes one or more components constructed of a ceramic matrix composite. The transition section may fluidly connect a high-pressure turbine and a low-pressure turbine within the gas turbine engine. The transition section may include a transition duct and a variable area turbine nozzle. One or both of the transition duct and the variable area turbine nozzle may be constructed of the ceramic matrix composite.

20 Claims, 6 Drawing Sheets

U.S. PATENT DOCUMENTS

| | | | |
|---|---|---|---|
| 4,214,850 A | 7/1980 | Sato | |
| 4,214,851 A | 7/1980 | Tuley et al. | |
| 4,214,852 A | 7/1980 | Tuley et al. | |
| 4,222,235 A | 9/1980 | Adamson et al. | |
| 4,264,270 A | 4/1981 | Geary et al. | |
| 4,270,344 A | 6/1981 | Yu | |
| 4,406,117 A | 9/1983 | Rowen et al. | |
| 4,541,567 A | 9/1985 | Jourdain et al. | |
| 5,269,139 A | 12/1993 | Klees | |
| 5,273,213 A | 12/1993 | Lewis | |
| 5,355,668 A * | 10/1994 | Weil et al. | 60/777 |
| 5,517,817 A | 5/1996 | Hines | |
| 5,620,301 A | 4/1997 | Lawer | |
| 5,630,701 A | 5/1997 | Lawer | |
| 5,683,225 A | 11/1997 | Orlando et al. | |
| 5,768,884 A | 6/1998 | Hines | |
| 5,775,092 A * | 7/1998 | Hines | 60/791 |
| 5,806,052 A | 9/1998 | Bonissone et al. | |
| 5,832,714 A | 11/1998 | Hines | |
| 5,854,154 A | 12/1998 | Radford et al. | |
| 5,911,679 A * | 6/1999 | Farrell et al. | 60/39.183 |
| 5,931,636 A * | 8/1999 | Savage et al. | 415/115 |
| 5,941,537 A | 8/1999 | Wallace et al. | |
| 6,013,592 A | 1/2000 | Merrill et al. | |
| 6,039,537 A | 3/2000 | Scheurlen | |
| 6,077,600 A * | 6/2000 | Atmur et al. | 428/293.4 |
| 6,092,361 A | 7/2000 | Romani | |
| 6,099,252 A | 8/2000 | Manning et al. | |
| 6,111,599 A | 8/2000 | Nance et al. | |
| 6,190,133 B1 | 2/2001 | Ress, Jr. et al. | |
| 6,197,424 B1 * | 3/2001 | Morrison et al. | 428/402 |
| 6,235,370 B1 | 5/2001 | Merrill et al. | |
| 6,274,078 B1 * | 8/2001 | Dunyak et al. | 264/442 |
| 6,287,511 B1 | 9/2001 | Merrill et al. | |
| 6,305,156 B1 | 10/2001 | Lui | |
| 6,324,828 B1 | 12/2001 | Willis et al. | |
| 6,325,593 B1 * | 12/2001 | Darkins et al. | 415/115 |
| 6,332,313 B1 | 12/2001 | Willis et al. | |
| 6,382,920 B1 | 5/2002 | Dopper | |
| 6,387,539 B1 | 5/2002 | Subramanian | |
| 6,428,740 B2 * | 8/2002 | Dunyak et al. | 264/635 |
| 6,441,341 B1 * | 8/2002 | Steibel et al. | 219/121.71 |
| 6,512,379 B2 | 1/2003 | Harold et al. | |
| 6,514,046 B1 | 2/2003 | Morrison et al. | |
| 6,516,603 B1 | 2/2003 | Urback et al. | |
| 6,517,959 B1 | 2/2003 | Beele | |
| 6,528,190 B1 * | 3/2003 | Campbell et al. | 428/701 |
| 6,602,053 B2 | 8/2003 | Subramanian | |
| 6,617,013 B2 | 9/2003 | Morrison et al. | |
| 6,641,907 B1 | 11/2003 | Merrill et al. | |
| 6,648,597 B1 | 11/2003 | Widrig et al. | |
| 6,670,026 B2 | 12/2003 | Steibel et al. | |
| 6,670,046 B1 | 12/2003 | Xia | |
| 6,676,783 B1 | 1/2004 | Merrill et al. | |
| 6,677,064 B1 | 1/2004 | Subramanian | |
| 6,682,300 B2 | 1/2004 | Bolms | |
| 6,703,137 B2 | 3/2004 | Subramanian | |
| 6,709,230 B2 | 3/2004 | Morrison et al. | |
| 6,733,907 B2 | 5/2004 | Morrison et al. | |
| 6,746,755 B2 * | 6/2004 | Morrison et al. | 428/166 |
| 6,751,940 B1 | 6/2004 | Paul | |
| 6,758,653 B2 | 7/2004 | Morrison | |
| 6,767,659 B1 | 7/2004 | Campbell | |
| 6,838,157 B2 | 1/2005 | Subramanian | |
| 6,878,041 B2 | 4/2005 | Esser et al. | |
| 6,883,331 B2 * | 4/2005 | Jonsson et al. | 60/773 |
| 6,884,384 B2 | 4/2005 | Merrill et al. | |
| 6,913,440 B2 | 7/2005 | Ciacci et al. | |
| 6,929,852 B2 | 8/2005 | Lane et al. | |
| 6,938,404 B2 | 9/2005 | Awdalla | |
| 6,939,603 B2 | 9/2005 | Oechsner | |
| 6,977,060 B1 | 12/2005 | Merrill et al. | |
| 6,981,841 B2 | 1/2006 | Krammer et al. | |
| 6,984,277 B2 | 1/2006 | Morrison et al. | |
| 7,001,679 B2 | 2/2006 | Campbell et al. | |
| 7,017,415 B2 | 3/2006 | Harrold et al. | |
| 7,044,709 B2 | 5/2006 | Bruce et al. | |
| 7,057,176 B2 | 6/2006 | Rothenfusser et al. | |
| 7,066,717 B2 | 6/2006 | Morrison et al. | |
| 7,067,181 B2 | 6/2006 | Burke | |
| 7,067,447 B2 * | 6/2006 | Campbell | 501/152 |
| 7,080,513 B2 | 7/2006 | Reichert | |
| 7,093,359 B2 | 8/2006 | Morrison et al. | |
| 7,123,031 B2 | 10/2006 | Twerdochlib | |
| 7,153,096 B2 | 12/2006 | Thompson et al. | |
| 7,176,681 B2 | 2/2007 | Zombo | |
| 7,179,524 B2 | 2/2007 | Merrill et al. | |
| 7,182,580 B2 | 2/2007 | Bostanjoglo et al. | |
| 7,182,581 B2 | 2/2007 | Bostanjoglo et al. | |
| 7,198,458 B2 | 4/2007 | Thompson | |
| 7,198,462 B2 | 4/2007 | Merrill et al. | |
| 7,198,860 B2 | 4/2007 | Vance | |
| 7,217,088 B2 | 5/2007 | Albrecht et al. | |
| 7,223,465 B2 | 5/2007 | Subramanian et al. | |
| 7,229,254 B2 | 6/2007 | Bast et al. | |
| 7,230,205 B2 | 6/2007 | Twerdochlib | |
| 7,237,389 B2 | 7/2007 | Ryan et al. | |
| 7,238,002 B2 | 7/2007 | Cairo et al. | |
| 7,247,002 B2 | 7/2007 | Albrecht et al. | |
| 7,247,003 B2 | 7/2007 | Burke et al. | |
| 7,250,776 B2 | 7/2007 | Twerdochlib | |
| 7,258,530 B2 | 8/2007 | Morrison et al. | |
| 7,270,890 B2 | 9/2007 | Sabol et al. | |
| 7,278,820 B2 | 10/2007 | Keller | |
| 7,291,407 B2 | 11/2007 | Merrill et al. | |
| 7,300,621 B2 | 11/2007 | Merrill | |
| 7,306,826 B2 | 12/2007 | Subramanian et al. | |
| 7,311,790 B2 | 12/2007 | Morrison et al. | |
| 7,316,539 B2 | 1/2008 | Campbell | |
| 7,326,030 B2 | 2/2008 | Albrecht et al. | |
| 7,329,087 B2 | 2/2008 | Cairo et al. | |
| 7,334,330 B2 | 2/2008 | Vance | |
| 7,341,428 B2 | 3/2008 | Twerdochlib | |
| 7,351,364 B2 | 4/2008 | Morrison et al. | |
| 7,371,043 B2 | 5/2008 | Keller | |
| 7,387,758 B2 | 6/2008 | Merill et al. | |
| 7,393,183 B2 | 7/2008 | Keller | |
| 7,402,347 B2 | 7/2008 | Morrison et al. | |
| 7,413,700 B2 * | 8/2008 | Merrill et al. | 264/650 |
| 7,434,670 B2 | 10/2008 | Good et al. | |
| 7,435,058 B2 * | 10/2008 | Campbell et al. | 416/236 R |
| 7,887,300 B2 * | 2/2011 | Mazzola et al. | 416/241 B |
| 7,963,745 B1 * | 6/2011 | Liang | 416/97 R |
| 2002/0190039 A1 * | 12/2002 | Steibel et al. | 219/121.71 |
| 2005/0064245 A1 | 3/2005 | Campbell | |
| 2005/0158171 A1 | 7/2005 | Carper et al. | |
| 2005/0186069 A1 | 8/2005 | Subramanian et al. | |
| 2005/0198967 A1 | 9/2005 | Subramanian | |
| 2005/0235493 A1 | 10/2005 | Philip et al. | |
| 2005/0241318 A1 | 11/2005 | Buehman et al. | |
| 2005/0252191 A1 * | 11/2005 | Orlando et al. | 60/226.1 |
| 2005/0254942 A1 | 11/2005 | Morrison et al. | |
| 2005/0287386 A1 | 12/2005 | Sabol et al. | |
| 2006/0019087 A1 | 1/2006 | Mazzola et al. | |
| 2006/0056959 A1 | 3/2006 | Sabol et al. | |
| 2006/0056960 A1 | 3/2006 | Sabol et al. | |
| 2006/0171812 A1 * | 8/2006 | Albrecht et al. | 416/190 |
| 2006/0225432 A1 | 10/2006 | Awdalla | |
| 2006/0228211 A1 * | 10/2006 | Vance et al. | 415/200 |
| 2006/0245984 A1 | 11/2006 | Kulkarni et al. | |
| 2006/0283014 A1 | 12/2006 | Subramanian et al. | |
| 2006/0284337 A1 | 12/2006 | Subramanian et al. | |
| 2006/0292001 A1 | 12/2006 | Keller et al. | |
| 2007/0017225 A1 * | 1/2007 | Bancalari et al. | 60/752 |
| 2007/0018670 A1 | 1/2007 | Ito et al. | |
| 2007/0031258 A1 | 2/2007 | Campbell et al. | |
| 2007/0048144 A1 | 3/2007 | Morrison et al. | |
| 2007/0065285 A1 | 3/2007 | Cairo et al. | |
| 2007/0072007 A1 | 3/2007 | Carper et al. | |
| 2007/0075455 A1 | 4/2007 | Marini et al. | |
| 2007/0082201 A1 | 4/2007 | Subramanian et al. | |
| 2007/0096371 A1 | 5/2007 | McGuigan et al. | |
| 2007/0098546 A1 | 5/2007 | Cairo et al. | |
| 2007/0128447 A1 | 6/2007 | Hazel et al. | |
| 2007/0140835 A1 | 6/2007 | Albrecht et al. | |
| 2007/0141367 A1 | 6/2007 | Dariola et al. | |
| 2007/0141369 A1 | 6/2007 | Hazel et al. | |

| | | |
|---|---|---|
| 2007/0147996 A1 | 6/2007 | Campbell |
| 2007/0172676 A1 | 7/2007 | Burns et al. |
| 2007/0196693 A1 | 8/2007 | Steibel et al. |
| 2007/0237630 A1 | 10/2007 | Schiavo, Jr. et al. |
| 2007/0237667 A1 | 10/2007 | Merill et al. |
| 2007/0240423 A1 | 10/2007 | Bulman et al. |
| 2007/0258809 A1 | 11/2007 | Mazzola et al. |
| 2007/0275210 A1 | 11/2007 | Heselhaus |
| 2008/0005854 A1 | 1/2008 | Fernandez Cid et al. |
| 2008/0025838 A1 | 1/2008 | Marini et al. |
| 2008/0025842 A1 | 1/2008 | Marini et al. |
| 2008/0025846 A1 | 1/2008 | Vance et al. |
| 2008/0087021 A1 | 4/2008 | Radonovich et al. |
| 2008/0101683 A1 | 5/2008 | Zombo et al. |
| 2008/0107521 A1 | 5/2008 | Morrison et al. |
| 2008/0116614 A1* | 5/2008 | Morrison et al. ............. 264/332 |
| 2008/0124512 A1 | 5/2008 | Steibel et al. |
| 2008/0131699 A1 | 6/2008 | Vance |
| 2008/0179465 A1 | 7/2008 | Cros |
| 2008/0181766 A1* | 7/2008 | Campbell et al. ............. 415/116 |
| 2008/0199307 A1 | 8/2008 | Keller |
| 2008/0199661 A1 | 8/2008 | Keller et al. |
| 2008/0202877 A1 | 8/2008 | Good et al. |
| 2008/0203236 A1 | 8/2008 | Mazzola et al. |
| 2008/0206542 A1 | 8/2008 | Vance et al. |
| 2008/0207075 A1 | 8/2008 | Merrill et al. |
| 2009/0067978 A1* | 3/2009 | Suljak, Jr. ........................ 415/1 |
| 2009/0097966 A1* | 4/2009 | McCaffrey .................... 415/130 |
| 2009/0148282 A1* | 6/2009 | McCaffrey et al. ........ 415/208.2 |
| 2009/0211260 A1* | 8/2009 | Kesseli et al. .................... 60/786 |
| 2009/0257875 A1* | 10/2009 | McCaffrey et al. ........... 416/179 |
| 2010/0054932 A1* | 3/2010 | Schiavo ........................ 415/200 |
| 2010/0183435 A1* | 7/2010 | Campbell et al. .......... 415/209.3 |
| 2010/0229561 A1* | 9/2010 | Bland ............................. 60/747 |
| 2010/0257733 A1* | 10/2010 | Guo et al. .................... 29/889.1 |
| 2010/0289192 A1* | 11/2010 | DiCarlo et al. ................ 264/625 |

FOREIGN PATENT DOCUMENTS

| | | |
|---|---|---|
| EP | 978772 | 2/2000 |
| EP | 1126221 | 8/2001 |
| EP | 1277918 | 1/2003 |
| EP | 1318215 | 6/2003 |
| EP | 1329592 | 7/2003 |
| EP | 1528343 | 5/2005 |
| EP | 1739356 | 1/2007 |
| EP | 1787967 | 5/2007 |
| EP | 1884714 | 2/2008 |
| EP | 1903184 | 3/2008 |
| WO | WO 9936688 | 7/1999 |
| WO | WO 9948837 | 9/1999 |
| WO | WO 0052307 | 9/2000 |
| WO | WO 0146084 | 6/2001 |
| WO | WO 0164250 | 9/2001 |
| WO | WO 0218674 | 3/2002 |
| WO | WO 02092536 | 11/2002 |
| WO | WO 2005043058 | 5/2005 |
| WO | WO 2005070613 | 8/2005 |
| WO | WO 2006040220 | 4/2006 |
| WO | WO 2006040235 | 4/2006 |
| WO | WO 2006121570 | 11/2006 |
| WO | WO 2007014005 | 2/2007 |
| WO | WO 2007025842 | 3/2007 |
| WO | WO 2007145607 | 12/2007 |
| WO | WO 2008091289 | 7/2008 |

* cited by examiner

CERAMIC MATRIX COMPOSITE TURBINE ENGINE

BACKGROUND OF THE INVENTION

The subject matter disclosed herein relates to gas turbines, and more specifically, to variable-area turbine nozzles and transition ducts within gas turbines.

In general, gas turbines combust a mixture of compressed air and fuel to produce hot combustion gases. The combustion gases may flow through one or more turbine components to generate power for a load and/or a compressor. Dual-shaft gas turbines may include a high-pressure turbine that drives a compressor and a low-pressure turbine that drives a load, such as a fan or a generator. The combustion gases may flow from the high-pressure turbine to the variable-area turbine nozzle of the low-pressure turbine through a transition duct. Due to the high temperature of the combustion gases, the transition duct and turbine nozzles may need to be designed to withstand high temperatures. The first-stage low-pressure turbine nozzle may need to be designed to provide a flow area that is variable as a function of aerodynamic load.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a turbine engine includes a high-pressure turbine, a low-pressure turbine, and a transition section configured to direct fluids from the high-pressure turbine to the low-pressure turbine. At least one component of the transition section is constructed of a ceramic matrix composite.

In another embodiment, a variable area turbine nozzle assembly includes at least one variable airfoil constructed of a ceramic matrix composite and at least one trunion configured to rotatably mount the at least one variable airfoil in a gas turbine engine.

In yet another embodiment, a transition duct includes a ceramic matrix composite housing that fluidly connects a high-pressure turbine to a low-pressure turbine.

In yet another embodiment, a gas turbine engine includes a high-pressure turbine, a low-pressure turbine, a variable area turbine nozzle configured to direct combustion gases into the high-pressure turbine or the low-pressure turbine, and a transition duct configured to fluidly connect the high-pressure turbine and the low-pressure turbine. The transition duct, the variable area turbine nozzle, or a combination thereof is constructed of a ceramic matrix composite.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
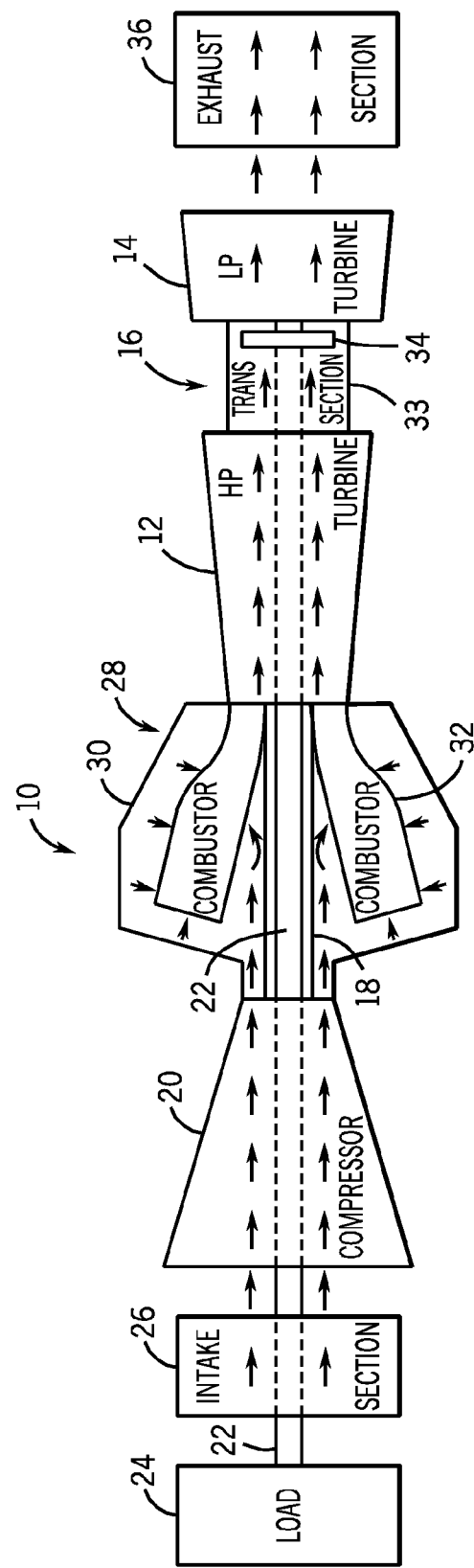
FIG. 1 is a schematic flow diagram of an embodiment of a gas turbine engine with a transition duct and a variable area turbine nozzle constructed of ceramic matrix composites.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gas turbines that incorporate ceramic matrix composites (CMCs) into the turbine nozzles and/or the transition duct. In accordance with certain embodiments, gas turbines may include a high-pressure turbine and a low-pressure turbine fluidly connected by a transition duct that directs combustion gases from the high-pressure turbine to the low-pressure turbine. Upon exiting the transition duct, the combustion gases may pass through variable area turbine nozzles (VATNs) for optimizing the partial-load performance of the turbines. The VATNs may be adjusted to vary the flow velocity and angle of combustion gases within the gas turbine engine as a function of low-pressure turbine load. Due to the high temperature of the combustion gases (exceeding approximately 650° C.), the transition duct and VATNs may be designed to withstand high temperatures. The transition duct and VATNs, particularly those constructed of metallic superalloys, may be cooled using a portion of compressed air bled from the compressor. However, air bled from the compressor is necessarily not used for producing power, which correspondingly decreases the overall efficiency and output of the gas turbine engine. Further, the transition duct and/or VATNs may have intricate geometries and sealing requirements, which in turn may increase the cost of the cooling designs. Moreover, in a conventionally cooled, metallic VATN, the need for variable area provides the opportunity for additional parasitic leakages of compressor airflow.

Accordingly, the present disclosure describes gas turbines that include VATNs and transition ducts constructed of CMCs that may reduce or eliminate cooling requirements within the gas turbine engine. Reduced cooling requirements may allow more of the compressed air to be used for producing power, thus increasing the operating efficiency and output of the gas turbine. Further, the reduced cooling requirements may enable simplified cooling designs and seals, which may in turn reduce costs and facilitate manufacturing. Moreover, VATNs constructed of CMCs may provide reduced inadvertent parasitic leakage losses.

FIG. 1 is a schematic flow diagram of an exemplary gas turbine engine 10 that includes a high-pressure turbine 12 and a low-pressure turbine 14. In certain embodiments, the gas turbine engine 10 may be employed within an aircraft, a watercraft, a locomotive, a power generation system, a mechanical drive, an oil-producing platform, a pipeline compressor, or combinations thereof. As discussed below, one or more components of the gas turbine engine 10 may comprise or may be constructed of CMCs that may provide higher temperature capability, thereby reducing cooling requirements of the gas turbine engine 10. As used herein, the phrases "constructed of CMCs" and "comprised of CMCs" shall mean components substantially constructed of CMCs. More specifically, the CMC components shall include more CMC material than just a layer or coating of CMC materials. For example, the components constructed of CMCs may be comprised or constructed substantially or entirely of CMC materials, including greater than about 50, 60, 70, 80, 90, or 100 percent CMC material.

Combustion gases from the high-pressure turbine 12 may flow through a transition section 16 and continue to expand in the low-pressure turbine 14. The turbines 12 and 14 may be axially displaced and may be in fluid-dynamic communication, but mechanically disconnected to allow rotation at different speeds via concentric shafts. Specifically, the high-pressure turbine 12 may rotate a shaft 18 to drive a compressor 20. The low-pressure turbine 14 may rotate a shaft 22 to drive a load 24. The load 24 may include a generator, a propeller, a transmission, a drive system, such as a load compressor, or combinations thereof. In certain embodiments, the load 24 may include a fan, such as a shrouded propeller, that directs air around the gas turbine engine 10 to increase the overall engine thrust.

As indicated by the arrows, air may enter the gas turbine engine 10 through an intake section 26 and flow into the compressor 20, which compresses the air prior to entry into the combustor section 28. The combustor section 28 includes a combustor housing 30 disposed concentrically around the shafts 18 and 22 and located between the compressor 20 and the high-pressure turbine 12. The compressed air from the compressor 20 enters combustors 32 where the compressed air may mix and combust with fuel within the combustors 32 to drive the turbines 12 and 14.

From the combustor section 28, the hot combustion gases flow through the high-pressure turbine 12, driving the compressor 20 via the shaft 18. The hot combustion gases may then flow through the transition section 16 and into the low-pressure turbine 14, driving the load 24 via the shaft 22. As noted above, the high-pressure turbine 12 and the low-pressure turbine 14 may rotate independently of each other. Accordingly, the transition section 16 may include a transition duct 33 for housing the combustion gases and a VATN assembly 34 for synchronizing the high-pressure turbine 12 and the low-pressure turbine 14. As described further below, the VATN assembly 34 includes a plurality of VATN's disposed at multiple radial positions in an annular configuration about the shaft 22. Each VATN may be adjustable along its longitudinal axis to vary the angle of attack of the combustion gases entering the low-pressure turbine 14. Further, each VATN may be rotated to modulate the flow of the combustion gases. The VATN assembly 34 may include variable area turbine nozzles or combinations of fixed and variable area turbine nozzles. After flowing through the VATN assembly 34 and the low-pressure turbine 14, the hot combustion gases may exit the gas turbine engine 10 through an exhaust section 36.

As noted above, various components of the gas turbine engine 10 are exposed to the hot combustion gases that flow through the gas turbine engine 10. Specifically, the transition duct 33 and the VATN assembly 34 may be exposed to hot combustion gases flowing from the high-pressure turbine 12 to the low-pressure turbine 14. In some embodiments, internal temperatures may reach 650° C. or higher which may make the components susceptible to creep, corrosion and/or high-cycle or low-cycle fatigue. Accordingly, certain components, such as the transition duct 33 and the VATN assembly 34 may be completely or partially constructed of CMCs to provide higher temperature capabilities. In certain embodiments, the higher temperature capabilities may allow for simplified cooling designs that may reduce manufacturing costs and sealing design requirements and/or allow for reduced cooling airflow, which may in turn increase the efficiency and output of the gas turbine engine 10. The higher temperature capabilities also may allow for reduced emissions of nitric oxide and nitrogen dioxide (collectively known as NOx) and carbon dioxide.

Figure 2:
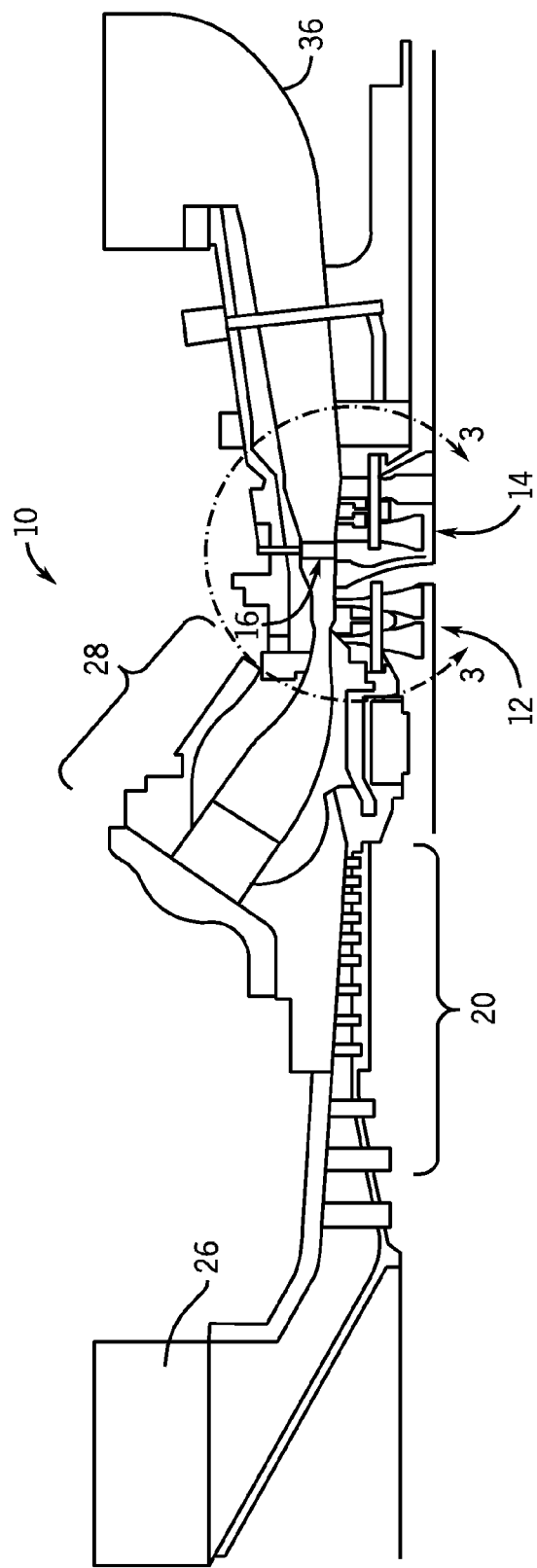
FIG. 2 is a sectional view of the gas turbine engine of FIG. 1 sectioned through the longitudinal axis.

FIG. 2 is a side view of an embodiment of the gas turbine engine 10 of FIG. 1 taken along the longitudinal axis. As described above with respect to FIG. 1, the gas turbine engine 10 includes the high-pressure turbine 12 and the low-pressure turbine 14. Air may enter through the air intake section 26 and be compressed by the compressor 20. The compressed air from the compressor 20 may then be directed into the combustor section 28 where the compressed air may be mixed with fuel gas or distillate, liquid fuel. The mixture of compressed air and fuel is generally burned within the combustor section 28 to generate a high-temperature, high-pressure combustion gas, which may be used to generate torque within the turbines 12 and 14. After flowing through the turbines 12 and 14, the combustion gas may exit the gas turbine engine 10 as exhaust gas through the exhaust section 36. As described above with respect to FIG. 1, the shafts for the turbines 12 and 14 may not be mechanically connected to allow the turbines 12 and 14 to rotate at different speeds.

Figure 3:
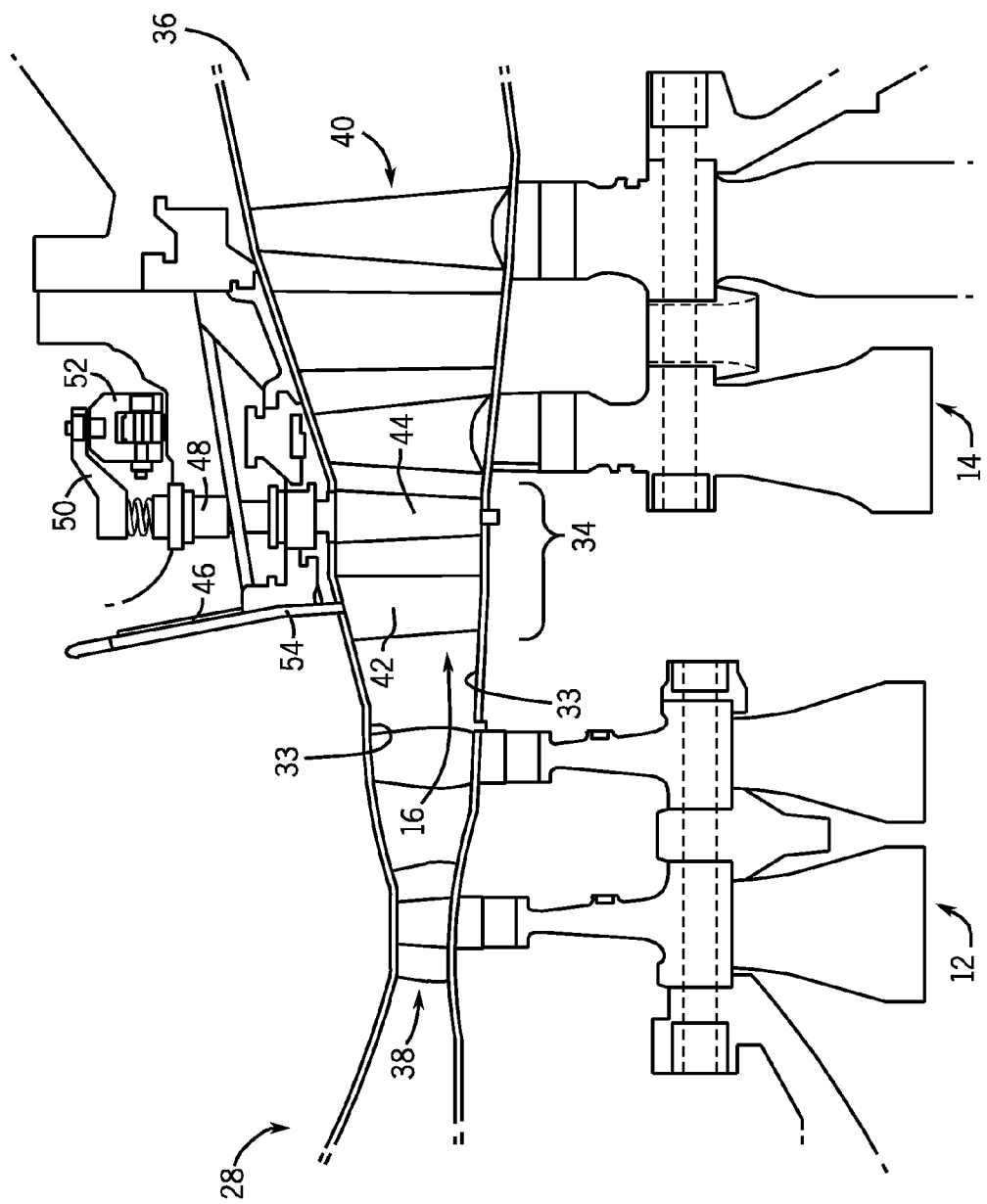
FIG. 3 is a detail view of a portion of the gas turbine engine of FIG. 2 depicting the transition section.

FIG. 3 is a detailed sectional view of the transition section 16 and the turbines 12 and 14 shown in FIG. 2. The high-pressure turbine 12 includes a bucket section 38 that may receive hot combustion gases from the combustor section 28. The hot combustion gases may flow through the bucket section 38 into the transition duct 33. Within the transition duct 33, the combustion gases may flow through the VATN assembly 34 and enter a bucket section 40 of the low-pressure turbine 14. The hot combustion gases may then exit through the exhaust section 36. As described above, the transition duct 33 may generally include a housing structure that fluid-dynamically couples the high-pressure turbine 12 to the low-pressure turbine 14 and provides a duct for combustion gases to flow between the turbines 12 and 14. The transition duct 33 may be constructed of a CMC, high temperature metallic alloy, or other suitable material.

The VATN assembly 34 includes stationary airfoils 42 and variable airfoils 44. The airfoils 42 and 44 may each represent a plurality airfoils disposed radially within the transition duct 16 to direct the combustion gases from the transition duct into the bucket section 40 of the low-pressure turbine 14. The stationary airfoils 42 may remain in fixed positions, while the variable airfoils 44 may rotate along their longitudinal axes. Trunnions 46 and 48 may be coupled to the airfoils 42 and 44, respectively, to support the airfoils 42 and 44. The trunnions 48 also may be coupled to a drive lever 50 that may be actuated to rotate the airfoils 44 along their longitudinal axes to change the angle of attack of the combustion gases flowing through the transition duct 33 into the bucket section 40. The lever 50 also may be coupled to a synchronization ring 52 that may synchronize the movements of the variable airfoils 44.

In certain embodiments, the airfoils 42 and 44 may include interior passageways for receiving a cooling fluid, such as air or steam. For example, the airfoils 42 and 44 may receive a portion of compressed air bled from the compressor 20 (FIG. 2). The cooling fluid may enter the airfoils 42 and 44 through flow passages 54 within the trunnions 46. For example, the flow passages 54 within the trunnions 46 may be fluidly coupled to a manifold that supplies air bled from the compressor. The cooling fluid may flow through the flow passages 54 and into cooling passages within the individual airfoils 42 and/or 44. In certain embodiments, the flow passages 54 also may supply air to the transition duct 33.

Figure 4:
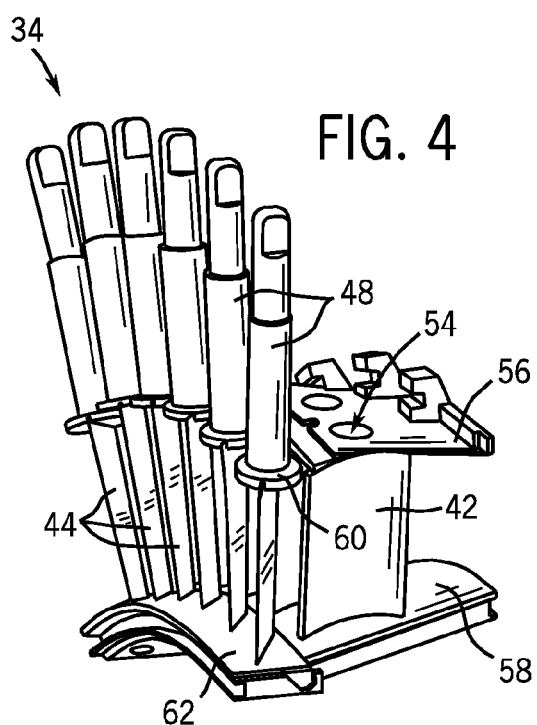
FIG. 4 is a perspective view of a portion of an embodiment of a variable area turbine nozzle assembly constructed of ceramic matrix composites.

FIG. 4 is a perspective view of the VATN assembly 34. For the sake of clarity, the trunnions 46 have been removed. The fixed airfoils 42 are disposed between surfaces 56 and 58, and the variable airfoils 44 are disposed between surfaces 60 and 62. Together, the surfaces 56, 58, 60, and 62 may form the transition duct 33 (FIG. 3). However, in other embodiments, additional structures may be disposed along the surfaces 56, 58, 60, and 62 to form the transition duct 33. As discussed above, the cooling air from the compressor may enter the fixed airfoils 42 through flow passages 54. In certain embodiments, ducts or manifolds may be provided to direct air from the flow passages 54 to cooling passages within the trunnions 48 of the variable airfoils 44. However, in other embodiments, the trunnions 48 may include passageways for providing cooling fluid to the variable airfoils 44.

To impede the flow of cooling air into the transition duct volume containing the hot combustion gases, seals may be provided around the flow passages 54. Seals also may be provided around the cooling passages and ducts configured to provide cooling fluid to the airfoils 44 as well as around the surfaces 60 and 62 that support the airfoils 44. For example, labyrinth and/or floating seals may be disposed around the surfaces 60 and 62 to impede entrainment of cooling fluid into the hot combustion gases flowing past the airfoils 42 and 44. The seals may be designed to impede the flow of cooling fluid into the transition duct 33 as the airfoils 44 rotate along their longitudinal axes between the surfaces 60 and 62.

As discussed above, the airfoils 42 and 44 may be constructed of CMCs, which may provide greater thermal capabilities. Components of the transition duct 33 (FIG. 3) also may be constructed of CMCs. The CMC materials for the transition duct 33 and the airfoils 42 and 44 may include any suitable type of fiber reinforced ceramic material. For example, the CMC material may include fiber reinforced non-oxide ceramics, such as silicon carbide, silicon nitride, boron carbide, and aluminum nitride. The CMC material also may include fiber reinforced oxide matrix ceramics, such as alumina, silica, mullite, barium aluminosilicate, lithium aluminosilicate, or calcium aluminosilicate. Further, the CMC materials may include combinations of oxide and non-oxide ceramics, as well as other suitable CMC materials. For example, oxide ceramics may be used for certain components while non-oxide ceramics are used for other components. The CMC materials may include any suitable type of oxide or non-oxide reinforcing fibers, such as silicon carbide, carbon, glass, mullite, and alumina.

As noted above, the CMC material may provide higher thermal capabilities, thereby increasing the efficiency of the gas turbine engine. For example, in certain embodiments, a silicon carbide-silicon carbide CMC component may be capable of withstanding temperatures from approximately 1204° C. to approximately 1316° C. In another example, a carbon fiber-silicon carbide matrix CMC component may be capable of withstanding temperatures from approximately 1538° C. to approximately 2482° C. In certain embodiments, the use of CMCs may facilitate reduced flow of cooling fluid within the airfoils. The CMCs also may simplify the design of seals used within the VATN assembly 34, and may simplify the geometry of the cooling passageways. Of course, other components of the airfoils such as trunnions, synchronization rings, and levers also may be constructed of the CMCs to provide additional thermal cooling benefits.

Figure 5:
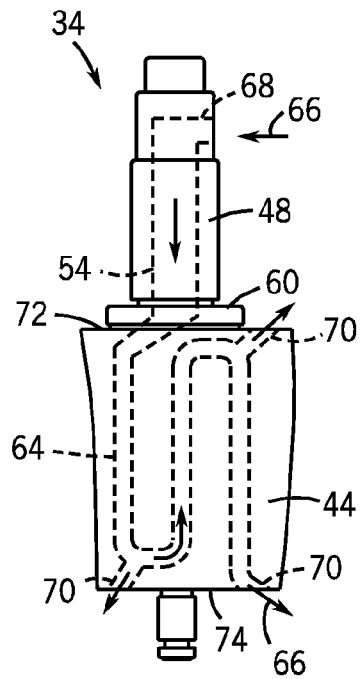
FIG. 5 is a perspective view of one of the variable area turbine nozzles shown in FIG. 4.

FIG. 5 is a perspective view of one of the variable airfoils 44 shown in FIG. 4. The airfoil 44 includes a serpentine cooling passage 64. The VATN assembly 34 may receive a cooling fluid (arrow 66), such as air bled from the compressor, through an inlet port 68 disposed on the trunnion 48 of the airfoil 44. The cooling fluid 66 may flow through the trunnion flow passage 54 and enter the serpentine cooling passage 64 where the cooling fluid may flow through the interior of the airfoil 44 to cool the airfoil. The cooling fluid may exit the airfoil 44 through an outlet port 70. Of course, the cooling passage 64 is shown by way of example only and is not intended to limiting. Many other cooling passage configurations and/or geometries may be provided. For example, the number of outlet ports may vary and the airfoils may include multiple separate cooling passages and/or angled passages. Moreover, the airfoils may include cooling passages for convection cooling the inside of the airfoil, as well as internal impingement holes for impingement cooling inner surfaces of the airfoils. Further, film-cooling holes may extend through the airfoil sidewalls to provide film cooling of external airfoil surfaces.

As noted above, the airfoil 44 may be constructed of a CMC material to reduce cooling flow within the cooling passage 64. The CMC material also may facilitate the use of simplified seals for impeding the flow of cooling fluid into the transition duct 33 (FIG. 3). For example, seals may be provided between the surfaces 60 and 72 to impede entrainment of cooling fluid during rotation of the airfoil 44. Seals also may be provided along the bottom surface 70 of the airfoil 44. In certain embodiments, the CMC material of the airfoil 44 may simplify the geometries of labyrinth seals and/or floating seals as well as other suitable seal types.

Figure 6:
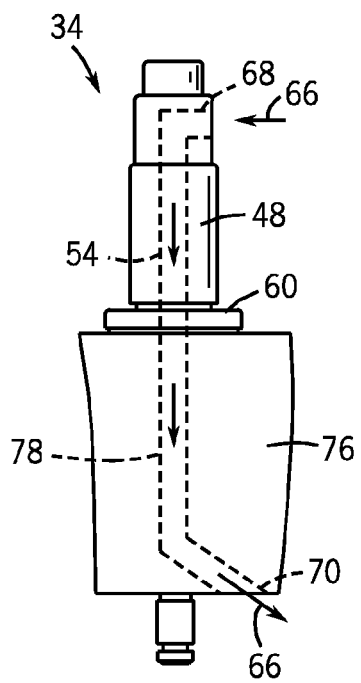
FIG. 6 is a perspective view of another embodiment of a variable area turbine nozzle with a simplified cooling passage.

FIG. 6 is an alternate embodiment of an airfoil 76 showing a simplified cooling passage 78 that may be provided for an airfoil 76 constructed of a CMC material. As noted above, the CMC material may provide increased thermal capacity, thereby allowing simplified cooling passages to be used in addition to, or instead of, reduced flow of the cooling fluid 66. The cooling passage 78 includes a relatively straight-line geometry that may simplify manufacturing of the airfoil 76. The cooling fluid 66 may enter the airfoil 76 through the inlet 68, flow through the trunnion flow passage 54, and cool the airfoil by flowing through the cooling passage 78. The cooling fluid 66 may exit through an outlet port 70. In certain embodiments, the use of the CMC material may reduce the number of outlet ports by 10-100 percent, and all subranges therebetween. More specifically, the number of outlet ports may be reduced by greater than 10, 20, 30, 40, 50, 60 70, 80, or 90 percent. Even more specifically, the use of the CMC material may reduce the number of outlet ports by 80-90 percent. Further, in certain embodiments, the CMC material may allow a reduction in the volume of cooling passages by 10-100 percent, and all subranges therebetween. For example, the CMC may allow a reduction in the volume of cooling passages by greater than 10, 20, 30, 40, 50, 60 70, 80, or 90 percent. More specifically, the volume of cooling passages may be reduced by 50-90 percent, or even more specifically by 80-90 percent.

Figure 7:
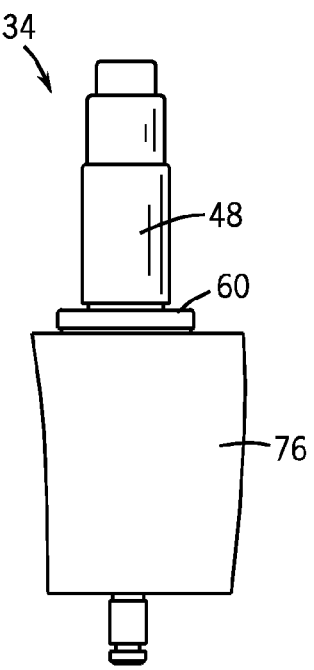
FIG. 7 is a perspective view of another embodiment of a variable area turbine nozzle without cooling passages.

FIG. 7 illustrates another embodiment of a VATN airfoil 79 constructed of CMC material where no cooling passages are included. The use of the CMC material may eliminate the need for cooling passages due to the increased thermal capability of the CMC airfoil 79. The elimination of cooling passages also may eliminate the need for seals around the airfoil 79 and may eliminate the need for cooling fluid to be provided from the compressor, which in turn may increase the efficiency of the gas turbine engine.

Figure 8:
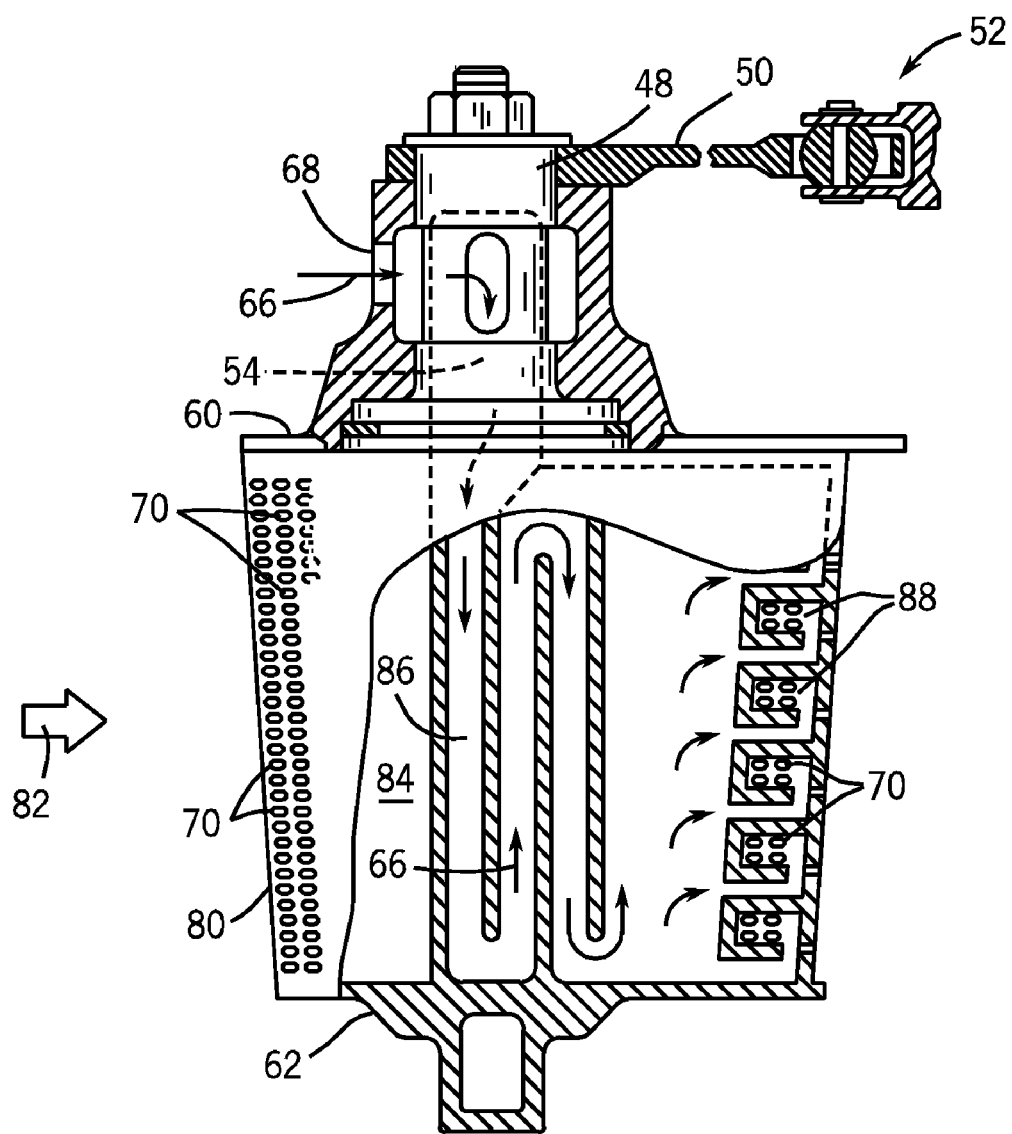
FIG. 8 is a sectional view of an embodiment of a variable area turbine nozzle sectioned through the longitudinal axis.

FIG. 8 is a cut away sectional view of another embodiment of a VATN airfoil 80. Combustion gases (arrow 82) may flow past the airfoil 80. As the hot combustion gases 82 flow over the airfoil, the gases may heat the airfoil. The airfoil 80 may be cooled by a cooling fluid 66 that may flow through the trunnion flow passage 54 into cooling flow passages 84, 86, and 88 disposed within the interior volume of the airfoil 80. The flow passages are shown in a generally serpentine configuration that includes a flow passage 84 for providing cooling fluid to the section of the airfoil with a generally thicker cross-section. The flow passage 86 may cool the center section of the airfoil, and the flow passage 88 may provide cooling to the section of the airfoil with a generally thinner cross-section. Of course, the flow passages 84, 86, and 88 are provided by way of example and are not intended to be limiting. For example, the number and geometry of cooling passages within the airfoil may vary. Several outlet ports 70 may allow the cooling fluid 66 to exit through outer surfaces of the airfoil 80 to provide film cooling for external airfoil surfaces. The airfoil 80 may be constructed of a CMC material allowing reduced flow of the cooling fluid 66.

Figure 9:
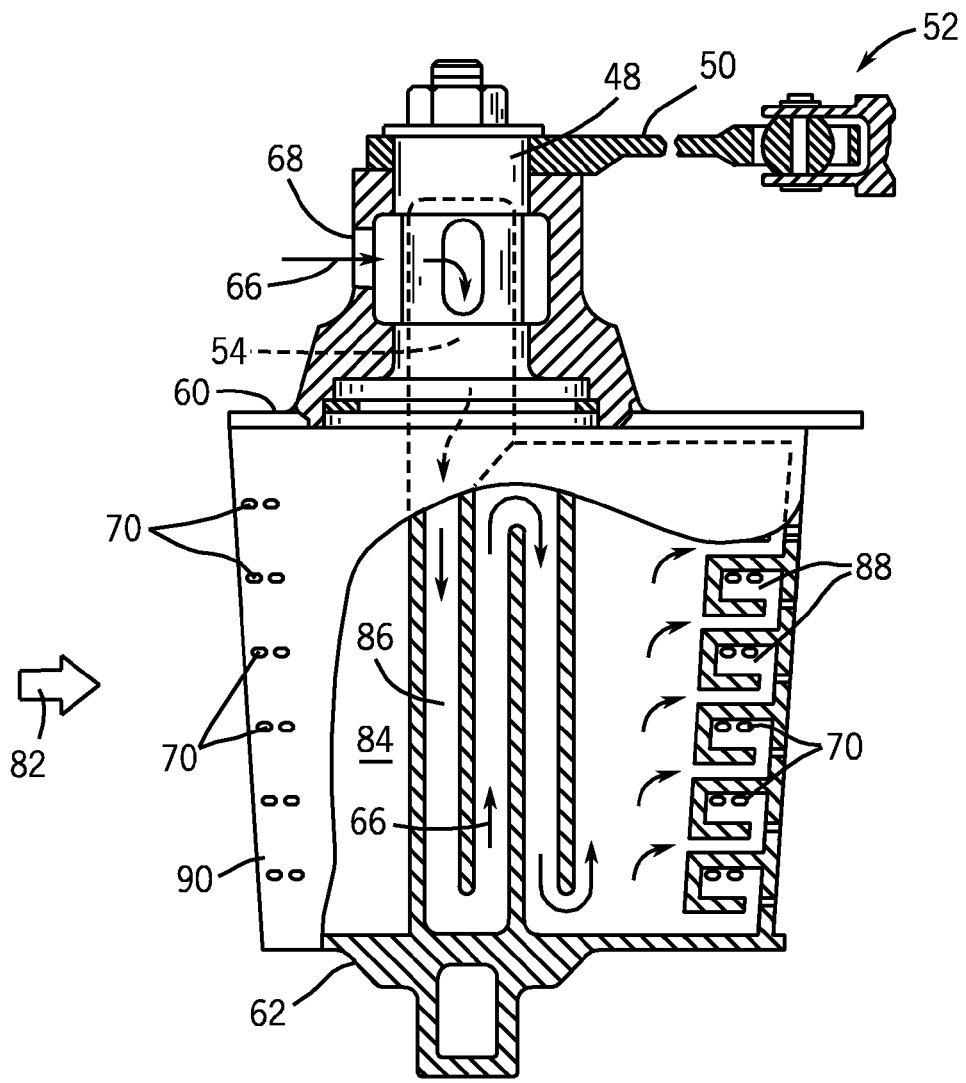
FIG. 9 is a sectional view of another embodiment of a variable area turbine nozzle sectioned through the longitudinal axis to depict reduced cooling passages.

In addition to, or instead of, reduced cooling flow, the CMC material may facilitate a reduction in the number of outlet ports 70. FIG. 9 depicts an alternate embodiment of a VATN airfoil 90 that includes approximately 80 percent fewer outlet ports 70 than shown in FIG. 8. As noted above, the reduction in the number of outlet ports may be possible due to the use of a CMC material to construct the airfoil. Further, the use of a CMC material to construct the airfoil may facilitate other percentage reductions in outlet ports. For example, the use of a CMC material may facilitate an approximately 10-100 percent reduction in outlet ports, and all subranges therebetween. More specifically, the use of a CMC material may facilitate a reduction in outlet ports by greater than 10, 20, 30, 40, 50, 60, 70, 80, or 90 percent. Of course, other components of the airfoils such as trunnions, synchronization rings, and levers also may be construction of the CMC material to provide additional cooling benefits.

The CMC VATNs and transition ducts may find application in a variety of types of gas turbine engines. However, the CMC materials are particularly well-suited to gas turbine engines employing increased inlet combustion gas temperatures in order to increase operating efficiencies. The CMC materials also may be well-suited to gas turbine engines employing complex airfoil and/or transition duct geometries that may make incorporation of cooling passages difficult. Further, the CMC materials may be used to construct airfoils used in various types of VATN assemblies. For example, the VATN assemblies may include dual segment airfoils that have a stationary component and a variable component. The VATN assemblies also may include fixed airfoils, variable airfoils, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbine engine, comprising:
   a high-pressure turbine;
   a low-pressure turbine; and
   a transition section disposed between the high-pressure turbine and the low-pressure turbine and configured to direct combustion fluids from the high-pressure turbine to the low-pressure turbine, wherein at least one component of the transition section comprises a ceramic matrix composite;
   a variable area turbine nozzle annularly disposed within the transition section, wherein the variable area turbine nozzle comprises:
      a plurality of variable airfoils extending between first inner and outer surfaces, wherein the plurality of variable airfoils and the first inner and outer surfaces are each constructed of the ceramic matrix composite; and
      a plurality of fixed airfoils extending between second inner and outer surfaces, wherein the plurality of fixed airfoils and the second inner and outer surfaces are each constructed of the ceramic matrix composite;
      wherein the ceramic matrix composite of the plurality of variable airfoils, the first inner and outer surfaces, the plurality of fixed airfoils, and the second inner and outer surfaces is directly exposed to the combustion fluids.

2. The turbine engine of claim 1, wherein the ceramic matrix composite comprises a silicon carbide fiber-silicon carbide matrix.

3. The turbine engine of claim 1, wherein the ceramic matrix composite comprises a non-oxide ceramic matrix, an oxide ceramic matrix, or combinations thereof.

4. The turbine engine of claim 1, comprising:
   a compressor; and
   a passageway configured to direct a flow of cooling fluid from the compressor to the transition section.

5. The turbine engine of claim 1, wherein each variable airfoil of the plurality of variable airfoils is configured to rotate along its longitudinal axis.

6. A variable area turbine nozzle assembly comprising:
   at least one variable airfoil constructed of a ceramic matrix composite; and
   at least one trunnion configured to rotatably mount the at least one variable airfoil in a gas turbine engine; and
   at least one fixed airfoil constructed of the ceramic matrix composite;

a first pair of opposing surfaces constructed of the ceramic matrix composite and disposed on opposite sides of the at least one variable airfoil; and a second pair of opposing surfaces constructed of the ceramic matrix composite and disposed on opposite sides of the at least one fixed airfoil;

wherein the first pair of opposing surfaces and the second pair of opposing surfaces are configured to form a transition duct between a high-pressure turbine and a low-pressure turbine; and wherein the ceramic matrix composite of the at least one variable airfoil, the at least one fixed airfoil, the first pair of opposing surfaces, and the second pair of opposing surfaces is configured to be directly exposed to combustion fluids flowing through the gas turbine engine.

7. The variable area turbine nozzle assembly of claim 6, wherein the at least one variable airfoil includes one or more cooling passages configured to direct a cooling fluid within the variable airfoil, and wherein the one or more cooling passages are disposed within the ceramic matrix composite.

8. The variable area turbine nozzle assembly of claim 7, wherein the one or more cooling passages include a plurality of outlet ports configured to direct the cooling fluid from the variable airfoil.

9. The variable area turbine nozzle assembly of claim 7, wherein the one or more cooling passages extend through the at least one variable airfoil in a relatively straight-line geometry and each comprise an angled outlet.

10. The variable area turbine nozzle assembly of claim 6, comprising one or more seals configured to impede entrainment of the cooling fluid into the transition duct.

11. The variable area turbine nozzle assembly of claim 6, wherein the at least one variable airfoil is configured to rotate along its longitudinal axis.

12. The variable area turbine nozzle assembly of claim 6, wherein the at least one trunnion is constructed of a ceramic matrix composite.

13. The variable area turbine nozzle assembly of claim 6, comprising a drive lever coupled to the at least one trunnions to rotate the at least one variable airfoil, wherein the drive lever is constructed of the ceramic matrix composite.

14. The variable area turbine nozzle assembly of claim 13, comprising a synchronization ring coupled to the drive lever, wherein the synchronization ring is constructed of the ceramic matrix composite.

15. A transition duct comprising a ceramic matrix composite housing configured to direct combustion fluids from a high-pressure turbine to a low-pressure turbine, wherein the ceramic matrix composite housing constructed of a ceramic matrix composite; and wherein the ceramic matrix composite housing comprises:

a first pair of inner and outer surfaces disposed on opposite sides of at least one variable airfoil and constructed of the ceramic matrix composite; and a second pair of inner and outer surfaces disposed on opposite sides of at least one fixed airfoil and constructed of the ceramic matrix composite;

wherein the ceramic matrix composite of the first pair of inner and outer surfaces and the second pair of inner and outer surfaces is directly exposed to the combustion fluids.

16. The transition duct of claim 15, wherein the ceramic matrix composite comprises a non-oxide ceramic matrix, an oxide ceramic matrix, or combinations thereof.

17. A gas turbine engine, comprising:

a high-pressure turbine;

a low-pressure turbine; and a variable area turbine nozzle configured to direct combustion gases from the high-pressure turbine to the low-pressure turbine; wherein the variable area turbine nozzle comprises:

a plurality of variable airfoils extending between first inner and outer surfaces, wherein the plurality of variable airfoils and the first inner and outer surfaces are each constructed of the ceramic matrix composite; and a plurality of fixed airfoils extending between second inner and outer surfaces, wherein the plurality of fixed airfoils and the second inner and outer surfaces are each constructed of the ceramic matrix composite;

wherein the ceramic matrix composite of the plurality of variable airfoils, the first inner and outer surfaces, the plurality of fixed airfoils, and the second inner and outer surfaces is directly exposed to the combustion fluids.

18. The variable area turbine nozzle assembly of claim 17, wherein the variable area turbine nozzle is configured to synchronize the high-pressure turbine and the low-pressure turbine.

19. The variable area turbine nozzle assembly of claim 17, wherein each variable airfoil of the plurality of variable airfoils is rotatable along its longitudinal axis to modulate a flow of the combustion fluids.

20. The variable area turbine nozzle assembly of claim 17, wherein the ceramic matrix composite comprises a silicon carbide fiber-silicon carbide matrix.

\* \* \* \* \*